H. J. Behrens,
Soldering Iron.

N° 20,975.  Patented July 20, 1858.

Witnesses.
D. Pomeroy
W. B. Woodbury

Inventor.
Henry J. Behrens

UNITED STATES PATENT OFFICE.

H. J. BEHRENS, OF NEW YORK, N. Y., ASSIGNOR TO CHAS. S. POMEROY, OF SAME PLACE.

IMPROVED SOLDERING-IRON.

Specification forming part of Letters Patent No. 20,975, dated July 20, 1858.

*To all whom it may concern:*

Be it known that I, HENRY J. BEHRENS, of New York, in the county of New York, in the State of New York, have invented a new and Improved Soldering-Iron; and I do hereby declare that the following is a full and exact description thereof, reference being had to the accompanying drawings, and to the letters of reference marked thereon.

The state of the art of making soldering-irons prior to the date of my invention was as follows, viz: A tool the outside figure of which was similar to that used by me was made of a solid piece of copper, the surface of which required to be tinned to enable it when hot to be used as a soldering-tool, and the tinning, filing, and cleaning were continual causes of wear upon its surface, particularly when filing off the oxide to insure a clean surface, metallic, on which the tin could take. All these produced rapid wear and consequent expense. Some of these tools had been made hollow for the purpose of introducing a red-hot plug of metal, so as to increase the amount of heat, or to insure its longer continuance.

My invention consists in making the soldering-tool hollow, with the view of introducing solder therein, and such other parts as may be hereinafter described.

Figure 1:
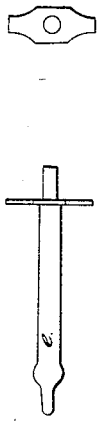
Figure 1:
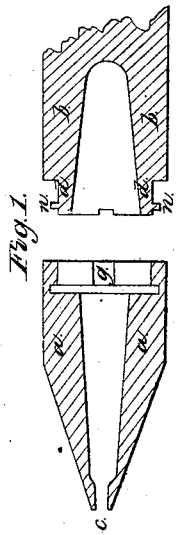

Figure 1 represents the cut section of the soldering-tool as I propose to make it. $a$ is the nozzle, which is a separate piece of metal from the mass of the tool, is hollow, and has a conical opening in its center terminating with an orifice of any desired shape at $c$. $b$ represents a mass of the tool, which is also hollow, and which joins $a$ at $d$, either by means of a screw, clamp, or any other equivalent means of attachment, such being preferred as will readily admit of the removal of $a$ for the purpose of introducing solder. An opening may be made, however, in any part of $b$ for the introduction of solder without the removal of $a$. Thus it will be perceived that as the soldering-tool is hollow throughout, the inside space may be filled up with solder, which arrangement, in connection with a suitable valve to regulate the feed, will make the tool self-feeding, and for particular styles of work, with a proper sized opening and in the required form, the valve may be dispensed with, as the solder will not run out during the process of heating, and will only deliver itself when in use for the purpose of soldering by being in contact with the surface with a pen-like flow, as in the delivery of ordinary writing-ink from a pen, which only occurs when in action, as when writing.

Figure 2:
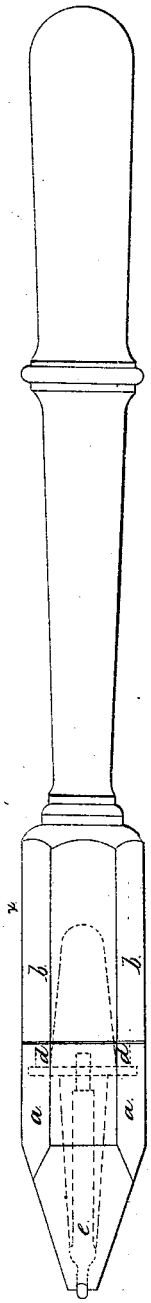

The valve $e$, Fig. 2, is of a tapering form, so that it may protrude slightly at the opening $c$, and consequently when the tool is in use its weight alone will cause the valve $e$ to rise sufficiently to admit a flow of solder, and to discontinue such flow whenever raised from the surface to be soldered.

For specific purposes the form of the nozzle $a$ and of the valve may be varied, said valve protruding through an opening of any desired form, and indeed, if required, there may be two or more openings admitting protrusions from the same or separate valves.

Figure 3:
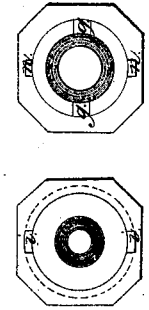
Figure 3:
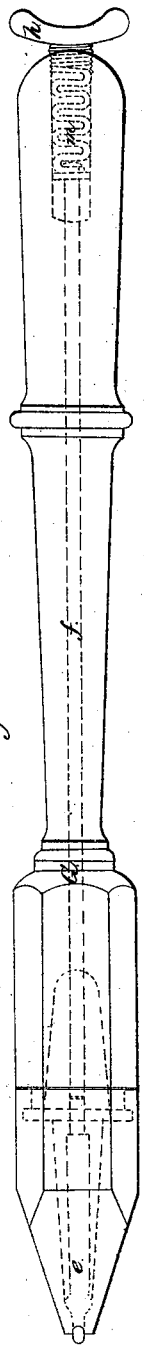

The valve $e$, in addition to the automatic action, as in its opening and shutting by its own weight and pressure on the tool, may have such contrivance or any equivalent contrivance as that represented in Fig. 3, where $f$ is a rod attached to the valve $e$, passing through the soldering-iron at $g$, and armed by a spring, $m$, and a handle, $h$, which may be withdrawn by hand, so as to increase the flow of solder, and which valve will be returned to its original position by the spring $m$.

The nozzle $a$ and the valve $e$ may be made of copper or any other suitable metal. The other part of that represented in the drawings by $b$ may be made of malleable iron or any other suitable metal, and for most purposes the whole may be made of iron.

By the use of this tool neater work may be performed with less waste of solder and without the wear and tear to as great extent as with the old soldering-tool before referred to.

I do not claim the use of a hollow soldering-iron, so made for the purpose of receiving a red-hot piece of metal to increase or continue the heat of the surface for a longer space of time, for such contrivance is not new; but What I do claim as my invention, and for which I desire to secure Letters Patent, is—

1. The use of a hollow soldering-iron containing solder, with or without a valve to regulate the flow thereof, as substantially hereinbefore set forth.

2. The combination of a hollow soldering-iron containing solder with an opening through which the solder may pass as required in the process of soldering, its delivery being automatic to its use.

New York, June 1, 1858.

HENRY J. BEHRENS.

Witnesses:
 DANL. POMEROY,
 W. R. WOODBURY.